United States Patent [19]

Watkins et al.

[11] 4,249,172

[45] Feb. 3, 1981

[54] ROW ADDRESS LINKING CONTROL SYSTEM FOR VIDEO DISPLAY TERMINAL

[75] Inventors: Richard R. Watkins, Chelmsford, Mass.; C. Steven Briggs, Kingston; John M. Doyle, Jr., Merrimack, both of N.H.

[73] Assignee: Honeywell Information Systems Inc., Waltham, Mass.

[21] Appl. No.: 72,500

[22] Filed: Sep. 4, 1979

[51] Int. Cl.[3] .............................................. G06F 3/153

[52] U.S. Cl. .................................... 340/726; 340/750; 340/792; 340/799; 364/900

[58] Field of Search ........................ 340/726, 792, 799

[56] References Cited

U.S. PATENT DOCUMENTS

| | | | |
|---|---|---|---|
| 3,614,766 | 10/1971 | Kievit | 340/726 |
| 3,680,077 | 7/1972 | Hoberecht | 340/726 |
| 3,683,359 | 8/1972 | Kleinschnitz | 340/750 X |
| 3,683,360 | 8/1972 | Matsushita et al. | 340/750 X |
| 3,706,075 | 12/1972 | Fredrickson et al. | 364/900 |
| 3,903,510 | 9/1975 | Zobel | 340/726 X |
| 4,129,859 | 12/1978 | Iwamura et al. | 340/799 X |

*Primary Examiner*—David L. Trafton

*Attorney, Agent, or Firm*—Gerald E. Lester; Ronald T. Reiling; Nicholas Prasinos

[57] ABSTRACT

A logic control system for a video display terminal is disclosed for accommodating vertically and horizontally varying entry points to a video memory to acquire first character bytes of rows of video information for display on a CRT screen. Dynamically changeable display page snapshots of the video memory, and the formation of display pages from randomly located rows of video information within the video memory are thereby provided.

2 Claims, 9 Drawing Figures

ROW ADDRESS LINKING CONTROL SYSTEM FOR VIDEO DISPLAY TERMINAL

BACKGROUND OF THE INVENTION

1. Field of the Invention

The present invention relates generally to logic control systems for transferring video information from a display memory to a CRT screen, and more particularly to a logic control system for accommodating the transfer of video information rows randomly located in the display memory in such a manner as to effect a dynamically occurring change to a display page without requiring the reconstruction of video information as stored in the display memory.

2. Prior Art

Video display systems have generally stored rows of video information in display memories in a predetermined order. Each row of video information has been of a fixed length, and has been read from the memory unit sequentially in the order stored. In order to insert or delete rows of video information within a display page, a reconstruction of the video information within the memory has been required.

In the present invention, variable length rows of video information randomly stored in the display memory, and having vertically and horizontally varying first character byte address entry points within the display memory may be linked to form a display page dynamically scanning the display memory without reconstruction of the video information as stored in the display memory.

SUMMARY OF THE INVENTION

The invention is directed to a logic control system for video display terminals, wherein video information rows randomly stored within a display memory and having vertically and horizontally varying entry points pointing to first character bytes of each row are linked to provide a display page.

More particularly, a link address counter is loaded under firmware control with a memory address pointing to a memory link table location. The memory link table has stored therein display memory addresses pointing to first character bytes of video display rows. The logic control system transfers the memory address stored in the indicated link table location to a memory address counter. The output of the memory address counter upon initialization points to a first character byte of a first row of video information comprising a display page. The memory address counter is incremented to point to successive character bytes in a display row, and the link address counter is incremented to point to the memory address of the first character byte of successive display rows comprising the display page.

In one aspect of the invention, the logic control system may accommodate the dynamic change of memory link table entries under firmware control during data transfers from the display memory to form a display page dynamically scanning the display memory without reconstruction of the video information as stored in the display memory.

DESCRIPTION OF THE DRAWINGS

For a more complete understanding of the present invention, and for further objects and advantages thereof, reference may now be had to the following description taken in connection with the accompanying drawings in which.

DESCRIPTION OF THE PREFERRED EMBODIMENT

FIG. 1

Figure 1:
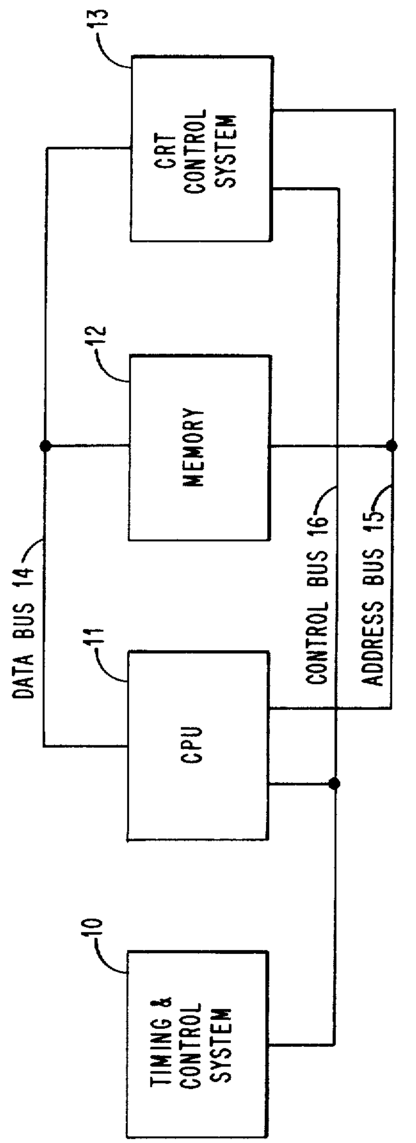
FIG. 1 is a functional block diagram of a video display system incorporating the invention.

FIG. 1 illustrates in functional block diagram form a video terminal system comprising a timing and control system 10, a central processing unit (CPU) 11, a memory unit 12 and a cathode ray tube (CRT) control system 13. Communication between the devices comprising the video terminal system is accomplished by way of a bidirectional data bus 14, an address bus 15 and a control bus 16.

The invention disclosed herein is embodied in the CRT control system 13.

The timing and control system 10 generates the cycle timing for the data bus 14, address bus 15 and the control bus 16. The system bus timing is divided into an address phase and a data phase which are offset. The system bus timing further is divided into alternate CPU cycles and direct memory access (DMA) cycles. The DMA cycles are used by peripheral subsystems to communicate with memory unit 12. The CPU 11 is operative during CPU cycles, while the CRT control system 13 is operative during DMA cycles.

The memory unit 12 is comprised of a random access memory (RAM) and a read only memory (ROM). Microprogrammed subroutines are stored in the ROM to control overall system operation. Sections of the RAM, however, are set aside as registers, buffers and word areas to be used during system operation. The memory unit 12 is operative during both CPU and DMA bus cycles. When a memory address is received by the memory unit 12 from the CPU 11 by way of address bus 15 during a memory read cycle, a data word is provided by the memory unit 12 to the data bus 14. During a memory write cycle, a data word is received from the CPU 11 by way of data bus 14, and is written into the memory location addressed by the CPU 11 on the address bus 15.

The CPU 11 thus is operative with both the data bus 14 and the address bus 15 during CPU cycles. During system operation, the CPU 11 may read or write into the RAM of the memory unit 12 to accommodate necessary system bookkeeping. The CPU 11 further controls the overall system operation through access to a microprogrammed subroutine stored in the ROM of the memory unit 12.

The CRT control system 13 is operative during DMA cycles, during which the control system supplies memory address signals to the memory unit 12 by way of the address bus 15. Control information and data characters thereby are addressed for each row of information supplied by the memory unit 12 to the control system 13 by way of data bus 14.

A brief description of control signals generated and received by the timing and control system 10 by way of control bus 16 during system operation are described below:

CPUADR−00—CPU Address Control

This signal defines the DMA and the CPU bus cycle timing of address bus 15. When the signal is low, the CPU address lines are gated to the address bus 15. When the signal is high, the DMA address lines are gated to the address bus 15.

CPUDAT−00—CPU Data Control

This signal defines the DMA and the CPU bus cycle timings. When the signal is low, the CPU controls the direction and purpose of the data bus 14. When the signal is high, the DMA devices control the data bus 14.

BUSRWC+00—Bus Read Write Control

This signal defines the type of data transfer on the data bus 14. It is valid during the CPUADR time for that phase of the bus cycle.

When the signal is at a logic one level during a CPU cycle, data is read from a device such as memory unit 12 to the CPU 11 over the data bus 14. When the signal is at a logic zero level, the data is written from the CPU 11 to the memory unit 12 over the data bus 14. If the signal is at a logic one level during a DMA cycle, data is read from the memory unit 12 to the CRT control system 13 over the data bus 14. If the signal is at a logic zero level, data is sent to the memory unit 12 over the data bus 15 from the control system 13.

DMAREQ—DMA Request

The DMAREQ+01 DMA request signal is assigned to the CRT control system 13. In the preferred embodiment described herein, there are four DMA bus cycle time slots: DMA1, DMA2, DMA3 and DMA4. A subsystem requests an assigned DMA bus cycle by forcing its DMAREQ signal to a logic zero level.

DMAKXO—DMA Acknowledge

The four DMA acknowledge signals DMAK10-, DMAK20-, DMAK30- and DMAK40- define respective time slots on the control bus 16 when forced to a logic zero level.

BRESET−00—Bus Reset

This signal is used by the CPU 11 to clear registers and reset flip-flops throughout the video terminal display system. System reset occurs when the signal transitions to a logic zero level.

FIG. 2

Figure 2:
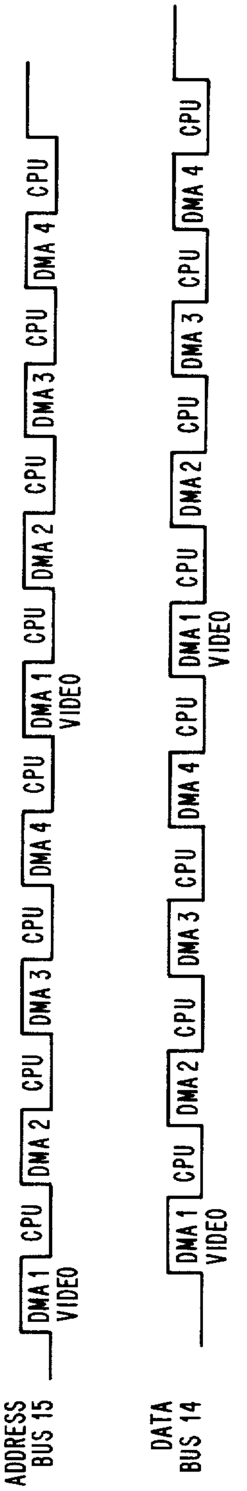
FIG. 2 is a graphic illustration of bus cycle channel times for the address and data busses of FIG. 1.

FIG. 2 illustrates in timing graph form the splitting of system bus time periods to alternate CPU cycles and DMA cycles.

Referring to FIG. 2, the address bus and data bus cycle times are divided into DMA and CPU cycle channels. The DMA cycles occur in order as DMA1, DMA2, DMA3, and DMA4 cycles. Each of the DMA cycles are repeated approximately every 4 microseconds in the preferred embodiment as described herein. The CPU is operative during each CPU cycle occurring on the data bus 14 or the address bus 15. The CRT control system 13 of FIG. 1 is exclusively assigned to be operative during DMA1 cycles to provide a CRT video display with continuous refresh information from the memory unit 12.

FIG. 3

Figure 3:
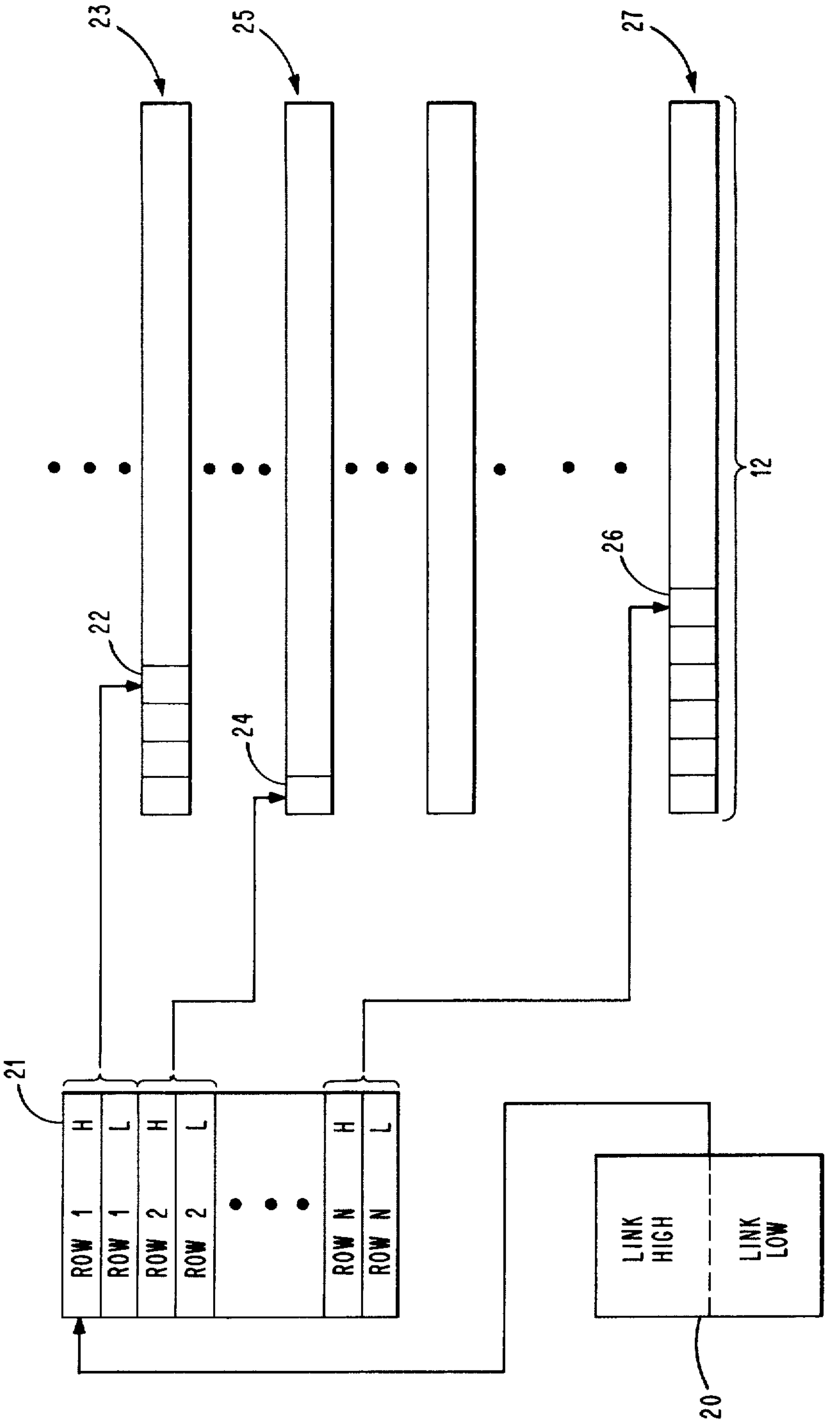
FIG. 3 is a graphic illustration of video information row linking in accordance with the invention.

FIG. 3 illustrates in graphic form the operation of the invention.

Referring to FIG. 3, a sixteen-bit link address counter 20 has stored therein a link address. The sixteen-bit output of the counter 20 points to a memory link table 21 having stored therein sixteen-bit addresses pointing to first characters of display rows stored in a memory link address partition of the memory unit 12 of FIG. 1. Each character address is comprised of an eight-bit address high and an eight-bit address low byte corresponding to the most significant byte and least significant byte, respectively, of a memory address.

A display page generally is comprised of twenty-five rows of display characters, and the size of a display row is generally comprised of eighty characters. The present invention accommodates the addressing of any character within memory unit 12 as a first display character in a display row. For example, a first sixteen-bit address in the link table 21 may point to a fourth character byte 22 in a row 23 of character bytes stored in memory unit 12. A second sixteen-bit address in link table 21 may point to a first character byte 24 in a row 25, and a last sixteen-bit address may point to the sixth character byte in the last row 27 of character bytes in memory unit 12. The invention thus provides not only vertical scrolling of memory in selecting randomly stored display rows in the order to be displayed, but also horizontal scrolling in that a first character of a display row may be at any location in memory. The first character to be displayed in a display row need not be the first character of a memory row.

FIG. 4

Figure 4:
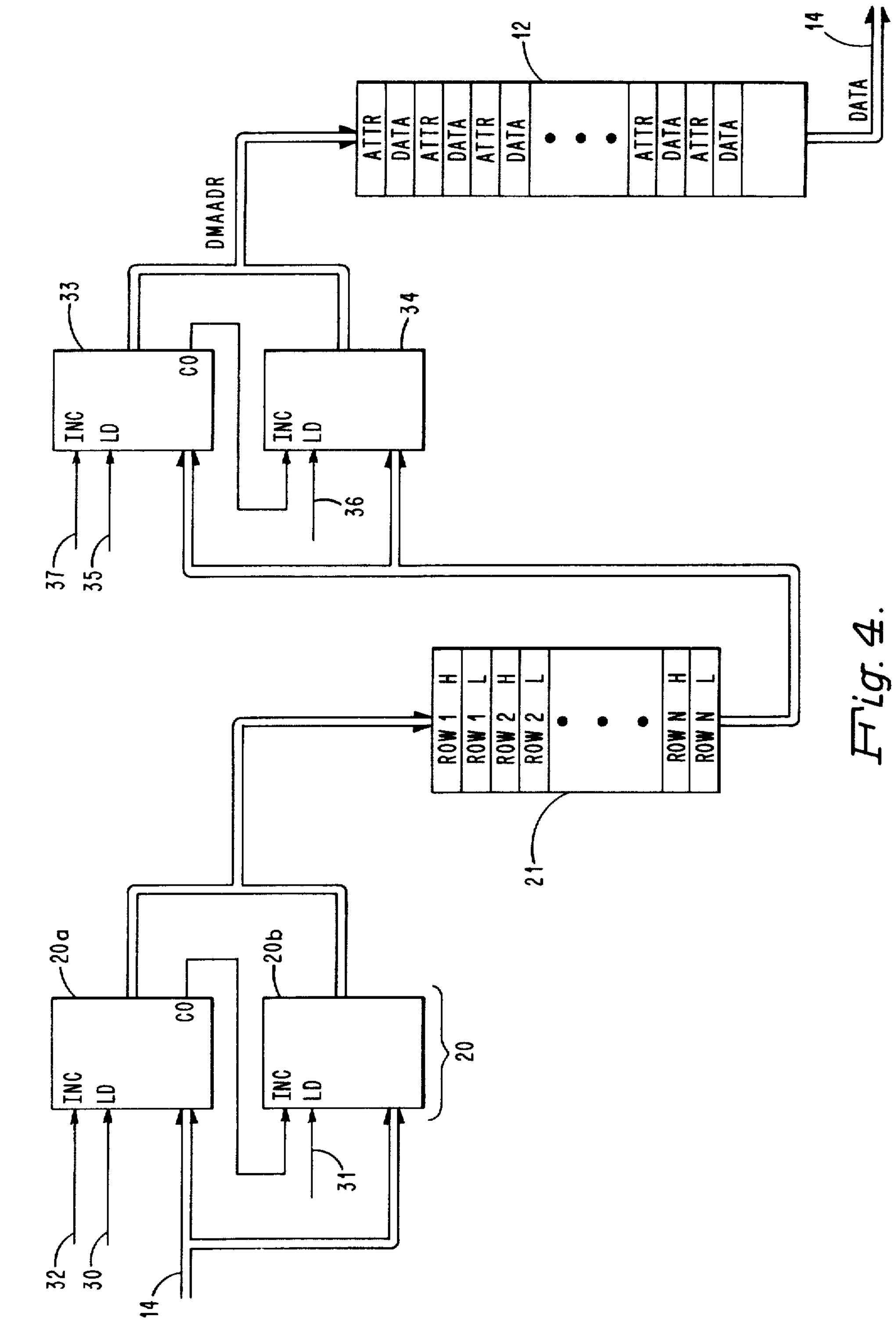
FIG. 4 is a partial functional block diagram and partial graphic illustration of the video information row linking in accordance with the invention.

FIG. 4 illustrates the operation of the invention in a more detailed graphic form.

Referring to FIG. 4, the link address counter 20 is comprised of an eight-bit upcounter 20*a* and an eight-bit upcounter 20*b*. The counters are loaded with a sixteen-bit address on data bus 14 in response to CPU 11 control signals on control lines 30 and 31. The sixteen-bit address points to a location in the memory link table 21.

Each time information is read from an addressed location of the link table 21, the counters 20*a* and 20*b* are incremented in response to a logic one pulse issued by the timing control system 10 of FIG. 1 to line 32. The increment input to the counter 20*b* is provided by the carry-out output of the counter 20*a*. The sixteen bits of information read from the link table 21 are loaded into eight-bit upcounters 33 and 34 in response to CPU 11 load commands on lines 35 and 36. The counters 33 and 34 provide a sixteen-bit address pointing to a memory location having stored therein a first character byte of a row of video information having both display character bytes and visual attribute character bytes. The counter 33 is incremented by a timing control clock signal on a control line 37 to point to successive display character bytes in the display row. When the last display character byte in the display row has been read from memory unit 12, the counters 20*a* and 20*b* are incremented to point to a next entry in the memory link table 21. The counters 33 and 34 thereafter are loaded with the sixteen-bit address stored in the indicated entry of the link table to point to the first character byte of a next display row in memory unit 12 comprising a display page. The counters 33 and 34 thereafter are incremented to point to successive character bytes in the display row. In response thereto, the video information stored in the memory unit 12 is applied to the system data bus 14 leading to a CRT control chip.

FIGS. 5–8

FIGS. 5–8 illustrate in detailed logic diagram form the logic control system comprising the invention.

In referring to the logic diagram illustrated in FIGS. 5–8, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

A CRT control unit 40 receives data from the memory unit 12 of FIG. 1 by way of the byte wide data bus 14. The acknowledge (ACK) input to the control unit 40 is connected to a control line 41 leading from a gate of the logic control system as shall be further explained. The clock input to the control unit is connected to a control line 42 leading from the control bus 16 of FIG. 1. The write enable (WR) input to the control unit is connected to a control line **40*a* of the control bus, and the B0 output is connected to a control line 40*b* leading to the control bus 16. The chip select (CS) input to the control unit is connected to a control line 40*c*** leading from a decoder of the logic control system as shall be further explained.

The CRT control unit 40 is manufactured and sold by the Intel Corporation of Santa Clara, California as an Intel Programmable CRT Controller Type 8275.

The output of gate 43 is applied to the J-input of a J-K flip-flop 45. The clock input to the flip-flop 45 is connected to a control line 46 leading from the control bus 16, and the K-input to the flip-flop is connected to the output of a NAND gate 47. The Q output of the flip-flop is applied to one input of gate 47, to the clock input of a D-type flip-flop 48, and to a control line 49. A second input to gate 47 is connected to the output of an AND gate 50 having a first input connected to a control line 51 leading from the control bus 16. A second input to gate 50 is connected to the output of a NAND gate 52, a first input of which is connected to a control line 53. A second input to gate 52 is connected to the output of an inverter having an input connected to the load input of a four-bit upcounter 54, to the load input of a four-bit upcounter 55 and to the output of a NAND gate 56.

The increment input to counter 54 is connected to a control line 57, and to the increment input to counter 55. The data input (DIN) to counters 54 and 55 are connected to ground. The reset inputs to counters 54 and 55 are connected to line 51. The bit 1 (B1) output of counter 54 is connected to one input of gate 56, the output of which is connected to a control line 58. The bit 2 (B2) output of counter 54 is connected to two inputs of a NAND gate 59, the output of which is connected to the reset input of flip-flop 48. The carry-out (CO) output of counter 54 is connected to the counter enable (CEN) input to counter 55. The bit 6 (B6) output of counter 55 is connected to one input of an AND gate 60, the output of which is connected to a second input of gate 56. The bit 8 (B8) output of counter 55 is connected to a second input of gate 60.

The D-input to flip-flop 48 is connected through a pull-up resistor 61 to a +5 volt source to provide a logic one level to the D-input. The Q output of the flip-flop 48 is applied to a control line 62, and the $\overline{Q}$ output of the flip-flop is connected to a control line 63.

Figure 5:
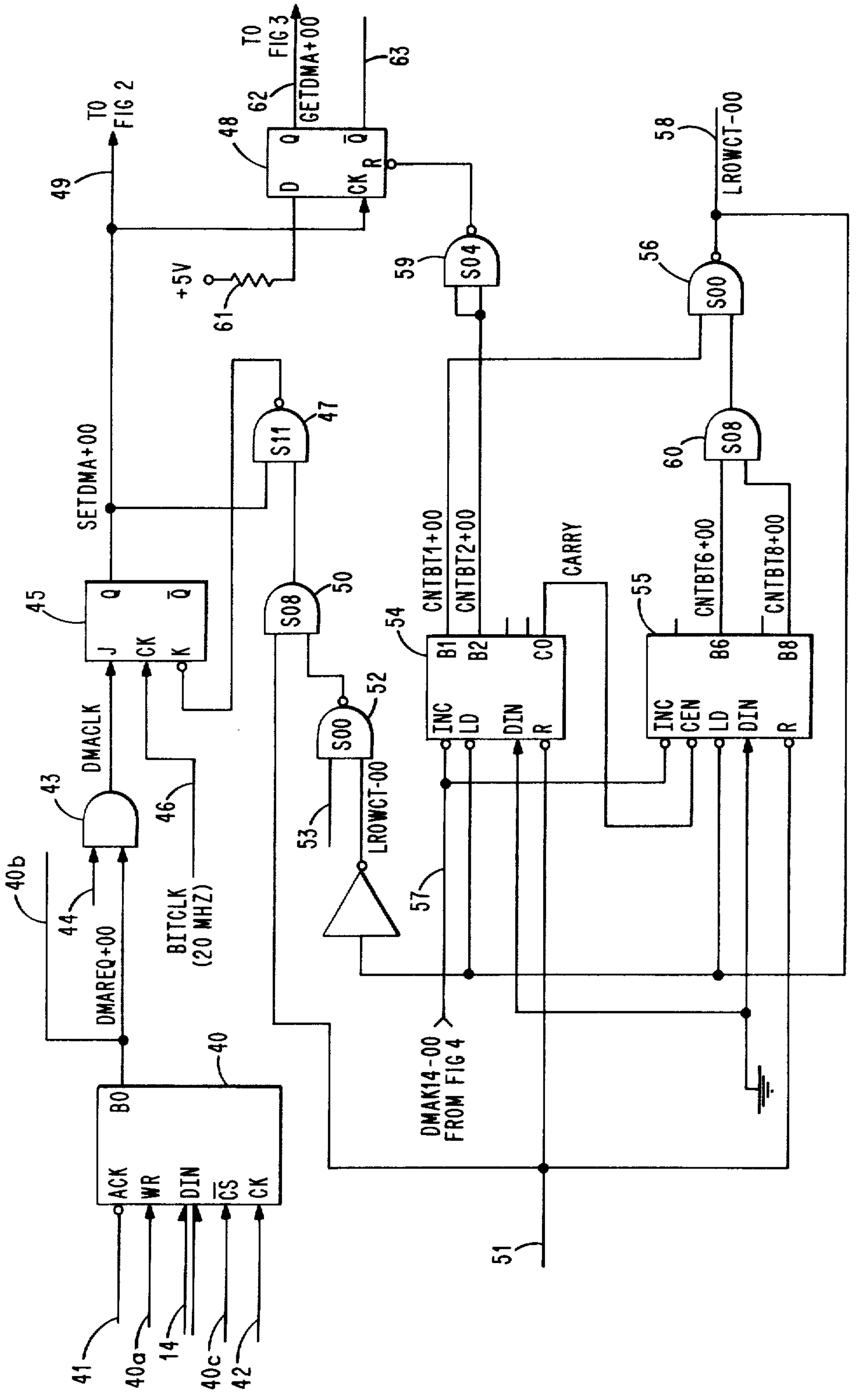
FIGS. 5–8 comprise a detailed electrical schematic diagram of the logic control system comprising the invention.
Figure 6:
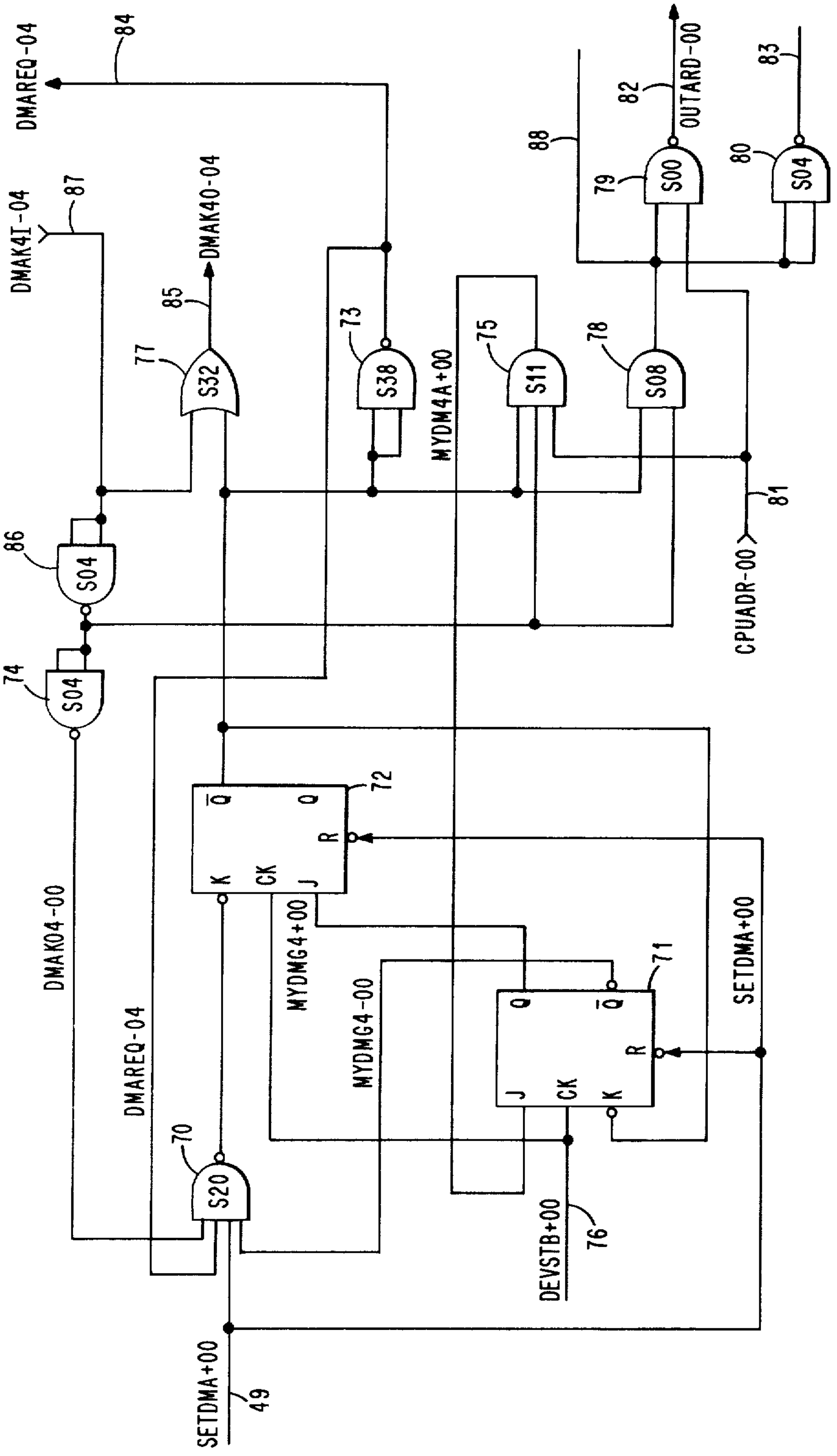

Referring to FIG. 6, a NAND gate 70 has one input connected to control line 49 of FIG. 5, and to the reset inputs of J-K flip-flops 71 and 72. A second input to gate 70 is connected to the output of a NAND gate 73, and a third input to gate 70 is connected to the output of a NAND gate 74. A fourth input to gate 70 is connected to the $\overline{Q}$ output of flip-flop 71, and the output of gate 70 is applied to the K-input of flip-flop 72.

The J-input to flip-flop 71 is connected to the output of an AND gate 75, and the K-input to the flip-flop 71 is connected to the $\overline{Q}$ output of flip-flop 72. The clock input to the flip-flop 71 is connected to a control line 76 leading from the control bus 16 of FIG. 1, and further is connected to the clock input of flip-flop 72. The Q output of flip-flop 71 is connected to the J-input of flip-flop 72. The $\overline{Q}$ output of flip-flop 72 also is applied to one input of an OR gate 77, and to two inputs of a NAND gate 73. The $\overline{Q}$ output of flip-flop 72 further is connected to a first input of gate 75 and to a first input of an AND gate 78.

The output of gate 78 is applied to one input of a NAND gate 79 and to two inputs of a NAND gate 80. A second input to gate 79 is connected to a control line 81 leading from the control bus 16 of FIG. 1, and to a second input of gate 75. The output of gate 79 is connected to a control line 82, and the output of gate 80 is connected to a control line 83. The output of gate 73 also is connected to a control line 84, and the output of gate 77 is connected to a control line 85. A second input to gate 77 is connected to two inputs of a NAND gate 86, the output of which is connected to two inputs of gate 74, to a third input of gate 75, and to a second input of gate 78.

The inputs to gate 86 further are connected to a control line 87 of the control bus 16, and the output of gate 78 is connected to a control line 88.

Figure 7:
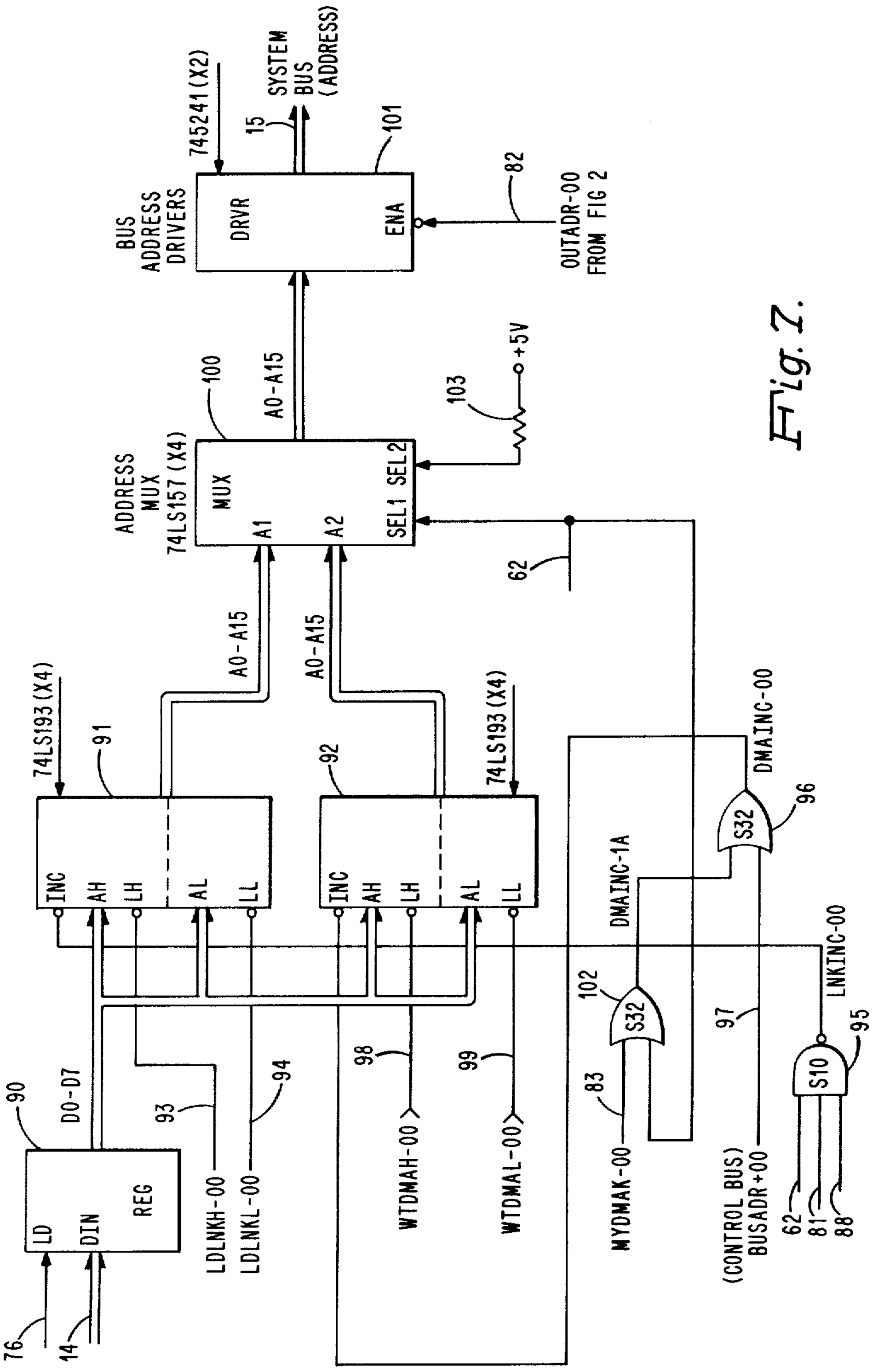

Referring to FIG. 7, the load input of an 8-bit register 90 is connected to control line 76 of FIG. 6, and the DIN input to the register is connected to data bus 14. The most significant four bits of the register 90 output are applied to the address high (AH) inputs of 16-bit counters 91 and 92. The least significant four bits of the register 90 output are applied to the address low (AL) inputs to counters 91 and 92. The load high (LH) input to counter 91 is connected to a control line 93, and the low low (LL) input to the counter 91 is connected to a control line 94. The control lines 93 and 94 may change logic states under CPU control only during a CPU cycle. The increment input to the counter 91 is connected to the output of a NAND gate 95, a first input of which is connected to control line 62 leading from the Q output of flip-flop 48 of FIG. 5. A second input to gate 95 is connected to control line 88 of FIG. 6. A third input to the gate 95 is connected to control line 81 of FIG. 6.

The increment input to counter 92 is connected to the output of an OR gate 96 having one input connected to a control line 97. The LH input to the counter 92 is connected to a control line 98, and the LL input to the counter 92 is connected to a control line 99. The control lines 98 and 99 may change logic states only during a DMA cycle. The sixteen-bit output of counter 92 is applied to the A2 input of a two-to-one multiplexer 100, the Al input of which is connected to the output of counter 91. The output of multiplexer 100 is applied through a driver logic unit 101 to the system address bus 15 of FIG. 1. The select 1 (SEL1) input to multiplexer 100 is connected to control line 62 leading from the Q output of flip-flop 48 of FIG. 5, and to one input of an OR gate 102. A second input to gate 102 is connected to control line 83 leading from the output of gate 80 of FIG. 6, and the output of gate 102 is applied to a second input of gate 96. The select 2 (SEL2) input to multiplexer 100 is connected through a pull-up resistor 103 to a +5 volt source to provide a logic one level to the SEL2 input.

The enable input to the driver logic unit 101 is connected to control line 82 leading from the output of gate 79 of FIG. 6.

Figure 8:
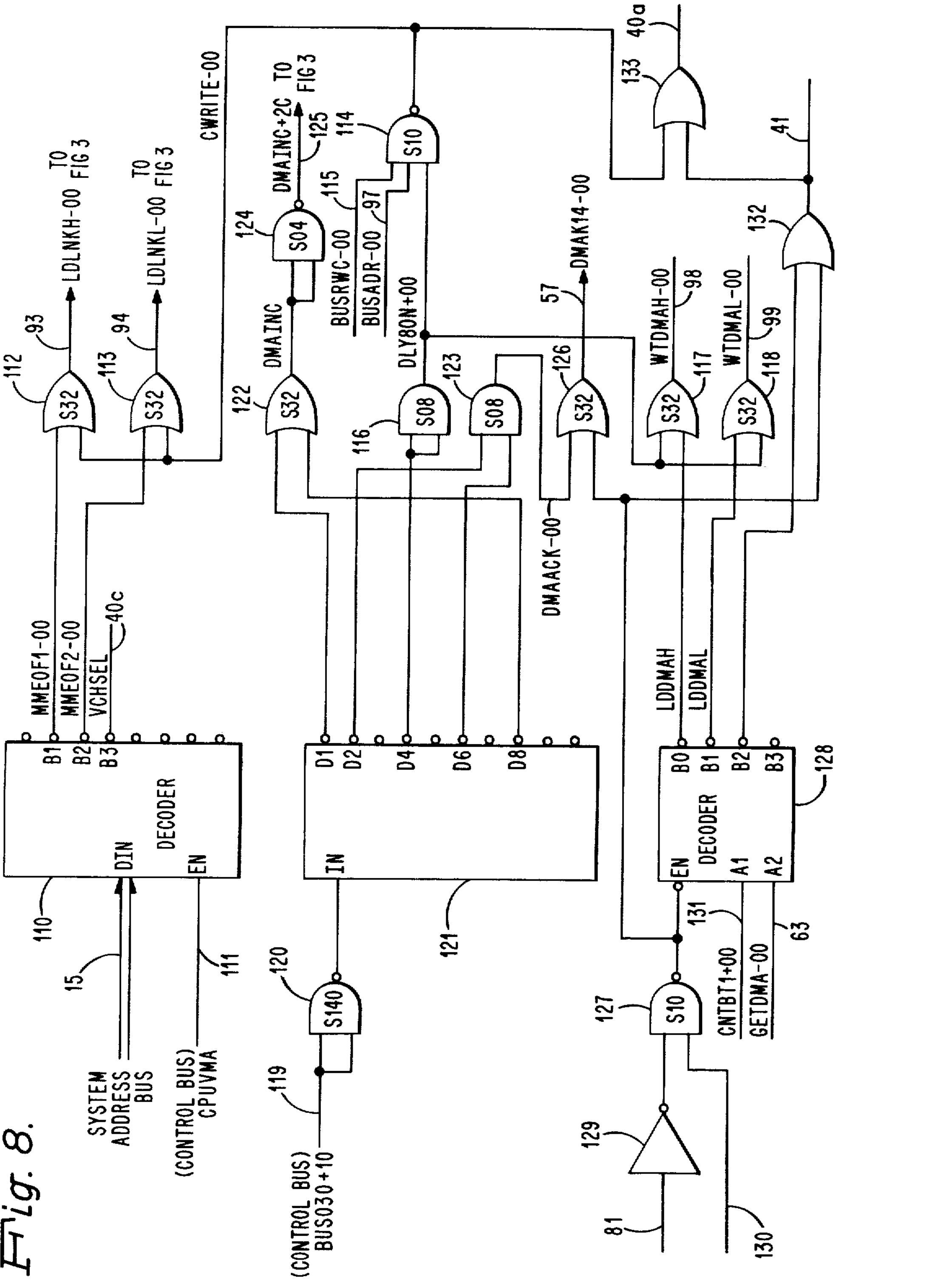

Referring to FIG. 8, the DIN input of an eight-bit decoder 110 is connected to the system address bus 15. The enable input to the decoder is connected to a control line 111 leading to the control bus 16 of FIG. 1. The B1 output of the decoder is applied to one input of an OR gate 112, and the B2 output of the decoder is applied to one input of an OR gate 113. The B3 output of the decoder is applied to control line 40*c* leading to the chip select input of control unit 40 of FIG. 5. The decoder 110 is of a type manufactured and sold to the public by Texas Instruments Inc. of Dallas, Texas, as a Model 74LS138 decoder.

A second input to gate 113 is connected to a second input of gate 112, and to the output of a NAND gate 114. The output of gate 112 is connected to line 93 leading to the LH input of counter 91 of FIG. 7, and the output of gate 113 is connected to line 94 leading to the LL input of counter 91.

One input to gate 114 is connected to a control line 115 leading to control bus 16 of FIG. 1, and a second input to gate 114 is connected to control line 97 leading to an input of gate 96 of FIG. 7. A third input to gate 114 is connected to the output of an AND gate 116, to one input of an OR gate 117 and to one input of an OR gate 118.

A control line 119 leading from the control bus 16 of FIG. 1 is connected to two inputs of a NAND gate 120. The output of gate 120 is applied to the input of a delay line 121 providing ten outputs delayed in order in 20.0 nanosecond increments. The 20.0 nanosecond D1 output of the delay line 121 is applied to one input of an OR gate 122, a second input of which is connected to the 160.0 nanosecond D8 output of the delay line. The 40.0 nanosecond D2 output of the delay line is applied to one input of an AND gate 123. The 80.0 nanosecond D4 output of the delay line 121 is applied to two inputs of gate 116. The 120.0 nanosecond D6 output of the delay line 121 is applied to a second input of gate 123.

The output of gate 122 is applied to two inputs of a NAND gate 124, the output of which is applied to a control line 125. The output of gate 123 is applied to one input of an OR gate 126, the output of which is connected to line 57 leading to the increment inputs of counters 54 and 55 of FIG. 5. The second input to gate 126 is connected to the output of a NAND gate 127 and to the enable input of a two-bit decoder 128. A first input to gate 127 is connected to the output of an inverter 129 having an input connected to line 81 of FIG. 6. A second input to gate 127 is connected to a control line 130 leading from the Q output of flip-flop 171 of FIG. 6. The Al input to decoder 128 is connected to a control 131 leading from the B1 output of counter 54 of FIG. 5, and the A2 input to the decoder 128 is connected to line 63 leading from the Q output of flip-flop 48 of FIG. 5. The B0 output of decoder 128 is connected to a second input of gate 117, and the B1 output of the decoder is connected to a second input of gate 118. The B2 output of decoder 128 is connected to a first input of an OR gate 132. The decoder 128 is of a type manufactured and sold to the public by Texas Instruments Inc. of Dallas, Texas as a Model 74S139 decoder.

The output of gate 117 is connected to line 98 leading to the LH input of counter 92 of FIG. 7, and the output of gate 118 is connected to line 99 leading to the LL input of counter 92. A second input to gate 132 is connected to the output of gate 127 and to a second input to gate 133. The output of gate 132 is connected to line 41 leading to the ACK input of the CRT control unit 40 of FIG. 5, and to one input of an OR gate 133. A second input to gate 133 is connected to the output of gate 114. The output of gate 133 is applied to control line 40*a* leading to the write enable (WR input) of control unit 40 of FIG. 5.

At the time of system power-on, the logic control system of FIGS. 5–8 enters into an initialization cycle. More particularly, a reset signal is applied by the CPU 11 to line 51 to reset counters 54 and 55, and to disable gate 50. The output of gate 47 thereupon transitions to a logic one level. In response thereto, the flip-flop 45 resets upon the next occurrence of a logic one pulse in the 20.0 MHz clock signal applied by the timing control system 10 to the control line 46.

Gate 133 under CPU control issues a write signal on line 40*a* to the write enable input of the CRT control unit 40, and the CPU 11 transfers firmware instructions from the memory unit 12 by way of the data bus 14 to the data input of the control unit. Firmware instructions thereby are loaded into command registers of the CRT control unit which thereafter are executed in a predetermined order.

It is to be understood that the CRT control unit 40 may be loaded either under DMA control or CPU control. For example, in the event a logic zero is received on line 40*c* from decoder 110 of FIG. 8, the control unit is selected to CPU control for supplying video display control information to the control unit. When a logic zero is received on line 41 leading to the acknowledge (ACK) input of the control unit, video information rows may be written character by character under DMA control from the memory unit 12 into the control unit 40 by way of data cable 14.

In the alternative, the control unit 40 may receive a logic one control signal on line 40*c* to select the control unit to DMA control. In this event, data may be written into the control unit 40 under DMA control upon receipt of a write enable signal on line 40*a* from gate 133 of FIG. 8. In either case, data inputs are synchronized by the clock signal on line 42 leading from an output of the timing control system 10 of FIG. 1.

The present invention is directed to a logic control system for selecting first character bytes of video information rows stored in memory unit 12. The control unit 40 thus is selected to DMA control during the operation of the logic control system.

Upon completing the programming of the CRT control unit, the CPU 11 issues a logic one signal to line 44 to enable gate 43. The CPU 11 further effects the transfer of link address information from the memory unit 12 of FIG. 1 to load the information into the register 90. Under the CPU control, a logic zero signal then is applied to control line 93 leading to the address high load input of the counter 91. The eight bits in the register 90 thereby are located into the address high part of the counter 91. The CPU 11 thereafter loads a second eight-bit link address into the register 90, followed by a logic zero pulse on control line 94 to load the second link address into the address low part of counter 91. The output of the counter 91 thereupon provides a sixteen-bit address pointing to a location in a memory link table such as table 21 of FIG. 3.

With the control line 62 at a logic one level, the multiplexer 100 is selected to the output of the counter 91. When the driver logic unit 101 is enabled as shall be further explained, the sixteen-bit output of the counter is applied through the driver logic unit 101 to the system address bus 15. The enable control signal on line 82 is a synchronization control signal which serves to apply DMA address information from the multiplexer 100 to the system bus 15 during a DMA cycle.

The link address information is applied to the memory unit 12, and the information stored in the addressed location is applied to the data bus 14 and loaded into register 90 as before described. Under the control of the logic control system of the invention, line 98 transitions to a logic zero level to load the address high portion of the counter 92. The control line 99 thereafter transitions to a logic zero level to load a second eight bits of address information into the address low portion of the counter 92. The counter 92 thereupon provides at its output a sixteen-bit memory address pointing to a row of video information in memory unit 12.

During the time period that the address high portion of the counter 92 is being loaded, the address high portion of counter 91 is incremented by one. Further, during the time period the address low portion of counter 92 is being loaded, the counter 91 again is incremented. The counter 91 thereupon addresses a next location in a memory link table.

After the counter 92 is loaded, the control line 62 transitions to a logic zero level as shall be further explained to select the multiplexer 100 to the output of counter 92. When control line 82 transitions to a logic zero level to indicate the occurrence of a DMA cycle assigned to the logic control system of FIGS. 5–8, the address information of counter 92 is applied through the driver logic unit 101 to the system address bus. The address information on the bus 15 at this time points to the address of a first character byte in a first video display row of information in memory unit 12.

The CPU 11 thereafter loads a start command instruction by way of data bus 14 into the CRT control unit 40. The BO output of the CRT control unit thereafter transitions to a logic one level to issue a direct memory access (DMA) request to line 40b which is sensed by the timing control system 10. In response thereto, the timing control system gates a memory address onto the address bus 15 as shall be further explained. Display data character and visual attribute bytes thereafter are read from the memory unit 12 by the logic control system of the present invention and applied to the data bus 14 for storage into a data buffer of the CRT control unit.

In response to the DMA request, the output of the gate 43 transitions to a logic one level which is applied to the J input of flip-flop 45. Upon the occurrence of a next logic one pulse in the 20 MHz clock signal on line 46, the Q output of the flip-flop 45 transitions to a logic one level. The Q output of a flip-flop 48 thereupon transitions to a logic one level which is applied by way of control line 62 to the SEL1 input of multiplexer 100, to NAND gate 95 and to OR gate 102 of FIG. 7. The Q output of flip-flop 48 thus serves to indicate that the logic control system of FIGS. 5–8 is seeking a DMA cycle.

Upon the occurrence of a next DMA cycle on the address bus 15 as indicated by control line 82, the output of the counter 92 shall be applied through the multiplexer 100 and the driver logic unit 101 to the address bus.

Referring to FIG. 5, each time a DMA cycle occurs on the system address bus 15 as indicated by control line 82 of FIG. 7, the logic control system generates a logic zero signal on control line 57 to increment the counter 54 to count the DMA cycles. The B2 output of the counter 54 is applied through gate 59 to reset the flip-flop 48 upon the completion of two DMA cycles. At this point in the operation of the system, the DMA address counter 92 of FIG. 7 contains the address of the first display character of the display row.

The B1 output of the counter 54 indicates the occurrence of each DMA cycle, and is used to generate the LH and LL inputs to counter 92 of FIG. 7. The B1 output further is applied to gate 56. When the carry-out output of the counter 54 enables the counter 55, each of the counters 54 and 55 thereafter are incremented when a DMA cycle occurs. The B6 and B8 outputs of the counter 55 are applied through gate 60 to gate 56. The output of gate 56 thus indicates when a DMA count of 161 has occurred. At that time, the output gate 56 transitions to a logic zero level to enable the load input of counters 54 and 55. Upon the next occurrence of an increment pulse on control line 57, the counters 54 and 55 are loaded with all zeros. The output of gate 56 thereupon transitions to a logic one level to disable the load inputs to the counters.

When the DMA cycle count reaches 161, and the output of gate 56 transitions to a logic zero level, the output of gate 52 transitions to a logic zero level when a next DMA cycle is acknowledged as indicated by control line 53 leading from control line 88 of FIG. 6. The output of gates 50 and 47 thereupon transition to a logic zero level which is applied to the K-input of flip-flop 45. At this time, the J-input to the flip-flop 45 is in a logic zero state. Thus, upon the next occurrence of a logic one clock pulse on line 46, the Q output of the flip-flop 45 transitions to a logic zero level to indicate that a complete row of video information in memory unit 12 has been read.

Referring to FIG. 8, when the CPU applies memory address information to the address bus 15, the CPU issues a logic one pulse to line 111 to enable the decoder 110. The address information thereupon is decoded to supply inputs to OR gates 112 and 113. More particularly, the B1 and B2 outputs of the decoder alternate from logic zero to logic one levels. When a logic zero signal is applied to gate 112, and the output of a gate 114 is at a logic zero level, the output of gate 112 transitions to a logic zero level to enable the LH input of counter 91 during a CPU cycle. When the B2 output of decoder 110 transitions to a logic zero level, and the output of gate 114 is at a logic zero level, the output of gate 113 transitions to a logic zero level to enable the LL input to counter 91. When the CPU has completed a LH and LL sequence, counter 91 will contain the address wherein is stored the high half of the address of the first display character of the first row.

The gate 114 is responsive to control lines 97, 115 and 119. The CPU 11 transitions the control line 115 to a logic one level when the logic control system is in a write state, and to a logic zero level when the system is in a read state. In addition, the timing control system 10 transitions the line 97 to a logic one level during a CPU cycle, and to a logic zero level during a DMA cycle. The timing control system further applies a 2.0 MHz signal to control line 119 at the input of gate 120, and through the delay line 121. When the 80.0 nanosecond D4 output of the delay line transitions to a logic one level, the output of gate 116 transitions to a logic one level. Thus, during a write state which occurs during a CPU cycle, the output of gate 114 shall transition to a logic zero level when the output of gate 116 transitions to a logic one level.

A 1.0 MHz timing signal is applied to control line 81 by the timing control system 10 during a DMA cycle. Further, when a DMA cycle is acquired by the logic control system of the present invention, the control line 130 transitions to a logic one level as shall be further described, and the output of gate 127 transitions to a logic zero level to enable the decoder 128. The outputs of the decoder are applied to OR gates 117, 118 and 132. When the B0 output of the decoder and the output of gate 116 are at a logic zero level, the output of OR gate 117 transitions to a logic zero level to enable the LH input to counter 92 of FIG. 7. When the B1 output of decoder 128 and the output of gate 116 are at a logic zero level, the LL input to counter 92 is enabled. The load input to the CRT control unit 40 of FIG. 5 is enabled by gate 132 when both the B2 output of decoder 128 and the output of gate 127 are at a logic zero level.

The OR gate 126 is responsive to gates 123 and 127 in supplying increment commands by way of line 57 to counters 54 and 55 of FIG. 5. Each time a DMA cycle is acquired by the logic control system of FIGS. 5–8, and a timing pulse is received by gate 126 from the gate 123, the counters 54 and 55 are incremented to count the number of character bytes read in a row of video information stored in memory unit 12.

Referring to FIG. 7, when the logic control system is seeking the first two DMA cycles of a row as indicated by a logic one level on control line 62, and a DMA cycle has been acquired by the control system as indicated by a logic one level on control line 88 during a DMA cycle, the output of gate 95 transitions to a logic zero upon the occurrence of a logic one pulse of a 1.0 MHz signal applied by the timing control system 10 to line 81. The counter 91 thereupon is incremented. Control line 62 is set to a logic zero level when two DMA request cycles have been completed. The counter 91 increment input thereupon is disabled until a next row link is initiated.

After completion of two DMA cycles, the control line 62 is set to the zero state. The output of counter 92 is applied to the bus driver 101 for further application to the system address bus when a subsequent DMA cycle occurs. When the logic control system acquires a DMA cycle as indicated by a logic zero level on control line 83 leading to the input of gate 102, line 97 transitions to a logic zero level as does the output of gate 102. When the logic control system is in a DMA cycle, the control line 97 leading to gate 96 transitions to a logic zero level, and the output of gate 96 in turn transitions to a logic zero level to increment the counter 92.

Referring to FIG. 6, a free-running 250.0 KHz signal from the timing control system 10 on line 87 is applied to two inputs of gate 86, and to OR gate 77. When line 87 is in a logic zero state, the output of gate 86 transitions to a logic one state to cause the output of gate 74 to transition to a logic zero state. The output of gate 70 is turn transitions to a logic one level which is applied to the K-input of flip-flop 72. The gate 102 also receives an input from gate 73 which indicates whether or not the logic control system has acquired a DMA cycle. If the logic control system has acquired a DMA cycle, the output of gate 73 is at a logic zero level, which also is applied to the gate 70. A third input to gate 70 is supplied by control line 49 leading from the Q output of flip-flop 45 of FIG. 5. A fourth input to the gate 70 is connected to the $\overline{Q}$ output of flip-flop 71.

At system initialization time, the output of gate 70 transitions to a logic zero level when the flip-flop 45 is set upon a first acquisition of a DMA cycle. The logic zero output of gate 70 is applied to the K-input of flip-flop 72, the J-input of which at that time is at a logic zero. Upon the occurrence of a logic one pulse in the 1.0 MHz signal applied by the timing control system to line 76, the $\overline{Q}$ output of the flip-flop 72 transitions to a logic one level which is applied to gates 77, 73, 75 and 78.

The $\overline{Q}$ output of flip-flop 72 also is applied to the K-input of flip-flop 71. If the logic control system is in a DMA cycle and a logic one pulse occurs on line 81 leading to second inputs to gates 75 and 79, the output of gate 75 transitions to a logic one level which is applied to the J-input of flip-flop 71. Upon a next logic one clock pulse occuring on control line 76, the $\overline{Q}$ output of the flip-flop 71 transitions to a logic one level which is applied to the J-input of flip-flop 72. Upon a next occurrence of a logic one clock pulse on control line 76, the Q output of flip-flop 72 transitions to a logic zero level. Upon a next occurrence of a logic one clock pulse on control line 76, the Q output of flip-flop 71 transitions to a logic zero level. When the flip-flop 71 is reset, a DMA cycle has been completed.

During the time period that flip-flops 71 and 72 are being reset, the output of gate 78 is at a logic one level when the outputs of gate 86 and the $\overline{Q}$ output of flip-flop 72 are at a logic one level. The output of gate 78 is ANDed with the 1.0 MHz signal on control line 81 by gate 72, the output of which transitions to a logic zero level when a memory address may be output on the system address bus during a DMA cycle.

Thus, when the output of gate 78 is at a logic one level, the logic control system applies address information to the system address bus 15. At this time, the output of gate 80 is at a logic zero level to indicate that the logic control system is in a DMA cycle.

When the output of gate 78 transitions to a logic zero level, the output of gate 80 transitions to a logic one level to cause one of counters 91 or 92 of FIG. 7 to be incremented.

When the timing control system receives a DMA request from gate 73 by way of control line 84, the timing control system acknowledges such receipt by applying a logic zero to line 87. When a DMA cycle is acquired as indicated by a logic one at the $\overline{Q}$ output of flip-flop 72, the output of gate 77 transitions to a logic one level to prevent the acknowledgement signal from being passed on to other devices interfacing with the address bus 15. The reset procedure for the flip-flops 71 and 72, however, prevent the logic control system from acquiring two consecutive DMA cycles if any other device on the address bus is seeking a DMA cycle.

FIG. 9

Figure 9:
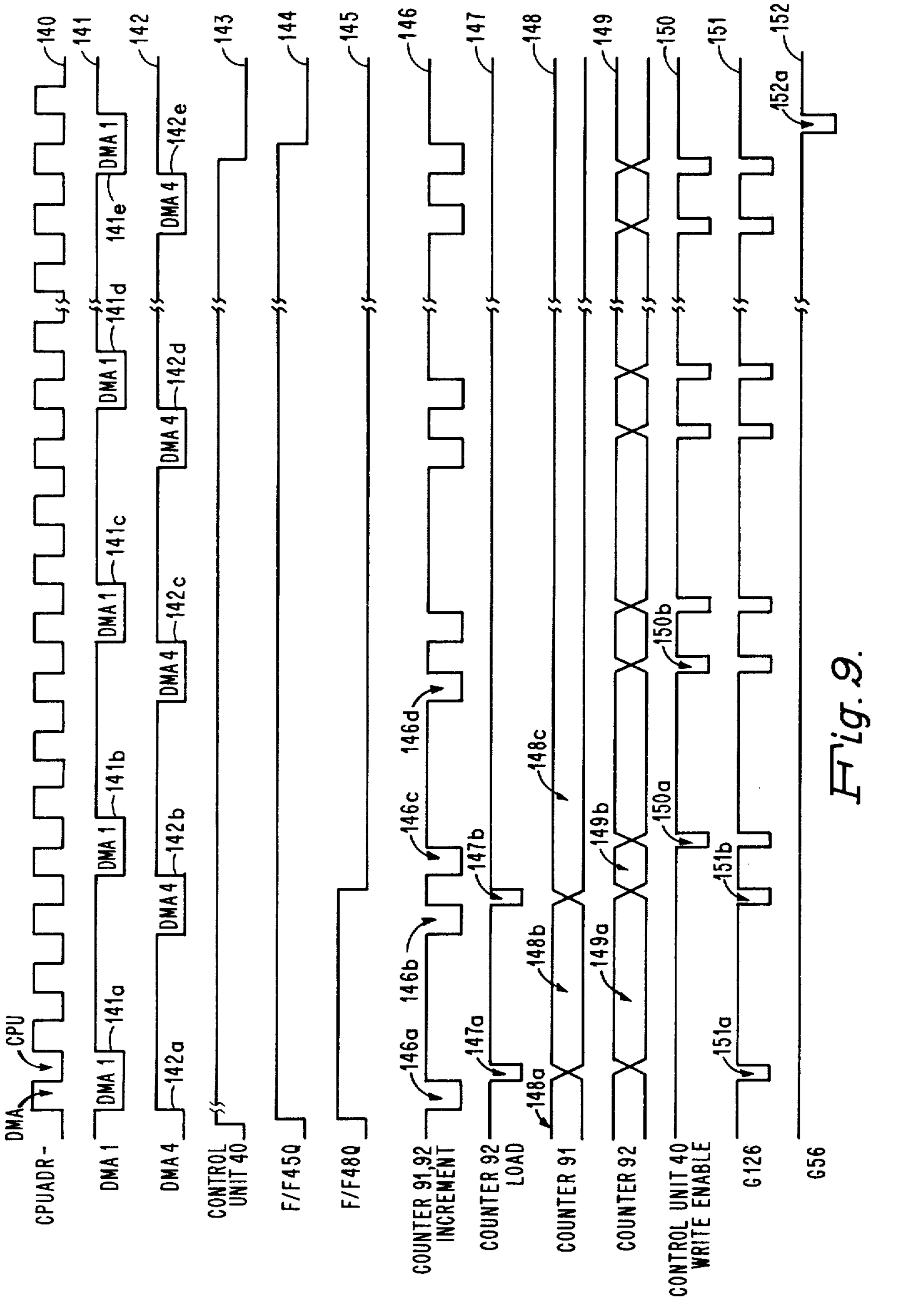
FIG. 9 is a timing diagram of timing control signals employed in the operation of the logic control system of FIGS. 5–8.

FIG. 9 illustrates in timing diagram form the operation of the logic control system of FIGS. 5–8.

Referring to FIG. 9, a waveform 140 illustrates a 1.0 MHz signal indicating the occurrence of DMA and CPU cycles on the system address bus 15 and the system control bus 16. The DMA and CPU cycles alternate continuously with a CPU cycle following a DMA cycle within each of four DMA channel time periods. The DMA channel time periods in turn occur in repeated sequences identified as the DMA1, DMA2, DMA3 and DMA4 channel time periods.

A waveform 141 illustrates as logic zero pulses 141a–141e the occurrence of a DMA1 channel time period within which a DMA cycle occurs in the first half of the time period and a Cpu cycle occurs in the trailing half of the time period. A waveform 142 illustrates as logic zero pulses 142*a*–142*d* the occurrence of a DMA4 channel time period within which DMA and CPU cycles occur as in the DMA1 channel time periods.

A waveform 143 illustrates the B0 output of control unit 40 of FIG. 5, and a waveform 144 illustrates the Q output of the J-K flip-flop 45 of FIG. 5. A waveform 145 illustrates the Q output D-type flip-flop 148 of FIG. 5. A waveform 146 illustrates the incrementing of counters 91 and 92, and the transfer of address information from counters 91 and 92 to the system address bus 15. A waveform 147 illustrates the loading of information from the register 90 of FIG. 7 into the counter 92. Waveforms 148 and 149 illustrate the operation of counters 91 and 92. A waveform 150 illustrates the write enable (WR) input to control unit 40 of FIG. 5, and a waveform 151 illustrates the output of gate 126 of FIG. 8. A waveform 152 illustrates the output of gate 56 of FIG. 5.

During time period that the B0 output of control unit 40 of FIG. 5 is at a logic one level as illustrated by waveform 143, the logic control system of FIGS. 5-8 is operational. More particularly, DMA channels 1 and 4 occur as illustrated by waveforms 141 and 142. When the DMA request output B0 of control unit 40 transitions to a logic one as illustrated by waveform 143, the logic control system of FIGS. 5–8 is operational during the DMA half of DMA channel 1 and channel 4 time periods.

When the B0 output transitions to a logic one level as illustrated by waveform 143, the logic level is latched at the Q output of flip-flop 45 as illustrated by waveform 144. During the time period that the waveform 144 is at a logic one level, a full row of video information is transferred from the memory unit 12 to the logic control system of FIGS. 5–8.

When the Q output of flip-flop 45 transitions to a logic one level, the Q output of flip-flop 48 of FIG. 5 transitions to a logic one level as illustrated by waveform 145. During the time period that the Q output of flip-flop 48 is at a logic one level, link address information stored in the counter 91 is transferred to the system address bus 15. More particularly, the address information transferred to the system address bus 15 from counter 91 is used to access the link table information stored in memory unit 12. Since the system data bus 14 is an eight-bit bus, two consecutive memory read operations are required to retrieve a sixteen-bit address byte. The sixteen-bit address byte is read from the link table of memory unit 12 on two consecutive DMA cycles, and the link information is stored in counter 92.

A first eight bits is transferred during the DMA half of the DMA channel time period as illustrated by logic zero pulse 146a of waveform 146. The counter 91 is incremented at the trailing edge of pulse 146a, and a second eight bits is transferred from the counter during the DMA half of a DMA4 channel time period as illustrated by logic zero pulse 146*a*. The counter 91 then is incremented again at the trailing edge of pulse 146*b*.

After the first sixteen bits of the link address information pointing to a location in a link table stored in memory unit 12 is transferred from counter 91 to the system address bus 15, a first eight bits of the memory address stored in the addressed link table location is loaded into the high portion of counter 92 during the CPU half of a DMA1 channel time period as illustrated by logic zero pulse 147*a* of waveform 147. The second eight bits of the memory address is loaded into the low portion of the counter 92 during the CPU half of a DMA4 channel time period as illustrated by the logic zero pulse 147*b* of waveform 147. The contents of counter 92 at this time points to a first character byte of a row of video information stored in memory unit 12. Upon loading the second eight bits into the counter 92 low portion, the Q output of flip-flop 48 transitions to a logic zero level as illustrated by waveform 145. Thereafter each time memory address is applied by the counter 92, the counter is incremented to address a new character byte as illustrated by the waveform 146. The counter 92 thereby controls the acquisition and transfer of video information in an information row stored in memory unit 12. More particularly, a first character byte of a video information row is addressed by the counter 92 during the DMA half of a DMA1 channel time period as illustrated by logic zero pulse 146*c* of waveform 146. The counter 92 then is incremented at the trailing edge of pulse 146*c* to point to a next character byte in the video information row. The next character byte is addressed during the DMA half of a DMA4 channel time period as illustrated by logic zero pulse 146*d*. The counter 92 is incremented at the trailing edge of pulse 146*d*, and the above-described process is repeated until a complete row of video information comprising character bytes and visual attribute bytes is addressed by the counter 92.

The operation of counters 91 and 92 further is illustrated by the waveforms 148 and 149. During the time indicated by the time period 148*a* of waveform 148, the counter 91 is loaded with the high half of a memory address stored in the link table which is applied to the system address bus 15. During the time period 148*b*, the counter 91 is incremented to point to the low half of the link table address. The counter 91 thereafter is incremented to point to the address of a next link table of a next video information row. In one aspect of the invention, the operation of the counters 91 and 92 in conjunction with a link table stored in the memory unit 12 accommodates the dynamic change of link table entries under firmware control during an information transfer by the logic control system of FIGS. 5–8 to the system address bus 15. The display memory thereby may be scanned to form a dynamically changing display page without requiring the reconstruction of video information stored in the display memory.

Referring to waveform 149, the counter 92 is loaded during the initial part of time period 149*a* with the high half of a memory address of a first information byte in a video information row stored in memory unit 12. This is the memory address stored in the link table location addressed by counter 91 during time period 148*a*. During the time period 149*b*, the counter 92 is loaded with the low half of the memory address stored in the link table location addressed by the counter 91 during the time period 148*b*. Thus, during the time period 149*b*, the counter 92 contains the complete address of a first character byte of a video information row stored in the memory unit 12. In response to the application of the contents of counter 92 to the system address bus 15 during time period 149*b*, a first character byte which in the preferred embodiment is a visual attribute byte of a video information row is received from the memory unit 12 and is written into the control unit 40 of FIG. 5 during the time period indicated by the logic zero pulse of 150*a* of waveform 150. The counter 92 thereafter is incremented at the trailing edge of pulse 146*c* of waveform 146 to point to next character byte of the video information row which in the preferred embodiment is a display character byte. The display character byte is written into the control unit 40 during the time period indicated by the logic zero pulse 150*b*. The above described process is repeated until an entire video information row is addressed by the counter 92.

The counters 54 and 55 of FIG. 5 indicate when a complete row of video information has been acquired from the memory unit 12. The first two increments of the couners 54 and 55 occur when the link table address is accessed. The output of gate 126 of FIG. 8 as illustrated by the logic zero pulses 151*a* and 151*b* of waveform 151 thus increment the counters 54 and 55 twice during the time period waveform 145 is at a logic one level. During these first two counts of the counters 54 and 55, the contents of counter 91 are applied to the system address bus 15 to retrieve from the memory unit 12 the first link table address to be loaded into the counter 92. The acquisition and transfer of data thereafter is controlled by the counter 92, and the memory unit 12 accesses are indicated by the remaining logic zero pulses of waveform 151. Upon each occurrence of a memory access, the counters 54 nd 55 are incremented as, when the counters 54 and 55 are decoded by gate 56 of FIG. 5 to indicate that a full row of information for display has been retrieved from the memory unit 12, the output of gate 45 transitions to a logic zero level as illustrated by waveform 152. The occurrence of the logic zero pulse 152*a* in waveform 152 causes the counters 54 and 55 to be reset.

The invention is directed to a logic control system for video display terminals, wherein video information rows randomly stored within a display memory and having vertically and horizontally varying entry points pointing to first character bytes of each row are linked to provide a display page.

More particularly, a link address counter is loaded under firmware control with a memory address pointing to a memory link table location. The memory link table has stored therein display memory addresses pointing to first character bytes of video display rows. The logic control system transfers the memory address stored in the indicated link table location to a memory address counter. The output of the memory address counter upon initialization points to a first character byte of a first row of video information comprising a display page. The memory address counter is incremented to point to successive character bytes in a display row, and the link address counter is incremented to point to the memory address of the first character byte of successive display rows comprising the display page.

The logic control system of the present invention thus accommodates a vertical and horizontal scrolling of the memory unit 12. Since information displayed on a CRT tube in the preferred embodiment described herein is formatted in eighty characters per row and twenty-five rows per display page, the video information stored in memory unit 12 for display on the CRT tube may be formatted into eighty characters per row or greater and 25 rows or greater per display page. The information displayed at any one time on the CRT tube thus is a segment of the displayable page stored in the memory unit 12.

A link table, also stored in system memory, contains address information that defines the starting memory address of each display row. Since the link table is stored in memory unit 12, it is accessible by the CPU and may be dynamically updated at any time by the CPU to effect both a vertical and a horizontal scrolling capability.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A hardware/firmware logic control system for addressing video information rows randomly stored in a memory unit and having vertically and horizontally varying first character byte address entry points in said memory unit, wherein said logic control system, a CRT control system, a CPU, a timing control system and said memory unit comprise a video display system, said logic control system which comprises:

(a) link address counter means receiving link address information from said memory unit under said CPU control and responsive to said timing control system for addressing a location in a memory link table stored in said memory unit, wherein entries in said memory link table may be dynamically changed by said CPU to effect a horizontal and vertical scrolling of said memory unit;

(b) memory address counter means responsive to said timing control system and receiving from said memory unit memory address information stored in said location of said memory link table for addressing a first and successive character bytes of a video information row randomly stored in said memory unit, wherein said first character byte may be positioned at any location in said memory unit;

(c) DMA cycle request means responsive to said CPU for requesting a DMA cycle from said timing control system during which video information may be transferred between said memory unit and said logic control system; and (d) DMA cycle control means responsive to said CPU, and to a DMA cycle acknowledgement signal from said timing control system for loading and incrementing said link address counter means and said memory address counter means to address respectively successive locations in said memory link table, and first and successive character bytes of each video information row stored in said memory unit comprising a display page for display by said CRT control system.

2. A hardware/firmware control method for addressing character bytes of video information rows randomly stored in a memory unit to form a display page for transfer to a visual display system, and for dynamically scrolling said memory unit both horizontally and vertically to refresh said display page, which comprises:

(a) addressing under CPU control a first location of a memory link table stored in said memory unit to provide a pointer to a first character byte of a first one of said video information rows, wherein said first character byte may occur in any location of said memory unit;

(b) applying to said memory unit memory address information stored in said first location of said memory link table to provide a first character byte of said first video information row to a visual display system;

(c) sequentially addressing successive character bytes of said first video information row in said memory unit to provide a first display row of a display page to said visual display system;

(d) addressing successive locations of said memory link table to provide first character bytes of successive video information rows comprising said display page, and repeating steps (b) and (c) for each of said successive video information rows; and (e) dynamically changing entries in said memory link table to effect both a horizontal and vertical scrolling of said memory unit, thereby dynamically refreshing said display page.

* * * * *